United States Patent
Ash et al.

(10) Patent No.: US 9,766,982 B2
(45) Date of Patent: Sep. 19, 2017

(54) PREFERENTIAL ALLOCATION OF PROCESSORS FOR STATESAVE IN A STORAGE CONTROLLER

(71) Applicant: INTERNATIONAL BUSINESS MACHINES CORPORATION, Armonk, NY (US)

(72) Inventors: Kevin J. Ash, Tucson, AZ (US); Trung N. Nguyen, Tucson, AZ (US); Maoyun Tang, Chandler, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 14/717,691

(22) Filed: May 20, 2015

(65) Prior Publication Data

US 2016/0342480 A1 Nov. 24, 2016

(51) Int. Cl.
G06F 9/46 (2006.01)
G06F 11/14 (2006.01)

(52) U.S. Cl.
CPC ...... *G06F 11/1451* (2013.01); *G06F 11/1461* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 5,619,644 A | 4/1997 | Crockett et al. | |
| 7,996,663 B2 | 8/2011 | Stillwell, Jr. et al. | |
| 8,806,081 B2 | 8/2014 | Fleming et al. | |
| 2003/0088608 A1* | 5/2003 | McDonald | G06F 9/4881 718/106 |
| 2007/0168760 A1* | 7/2007 | Ko | G06F 11/0766 714/49 |

* cited by examiner

*Primary Examiner* — Kenneth Tang
(74) *Attorney, Agent, or Firm* — Rabindranath Dutta; Konrad Raynes Davda & Victor LLP

(57) ABSTRACT

A determination is made of a plurality of components whose states are to be determined to generate a statesave. At least one central processing unit that determines a state of a first component of the plurality of components faster than other central processing units is assigned to determine the state of the first component to include in the statesave, where more processing operations have to be performed to determine the state of the first component in comparison to any other component of the plurality of component. One or more of the other central processing units are assigned to other components of the plurality of components to determine states of the other components to include in the statesave.

15 Claims, 11 Drawing Sheets

PREFERENTIAL ALLOCATION OF PROCESSORS FOR STATESAVE IN A STORAGE CONTROLLER

BACKGROUND

1. Field

Embodiments relate to the preferential allocation of processors for statesave in a storage controller.

2. Background

Computer systems, including data processing systems or subsystems, such as storage systems, may include a plurality of hardware, software, or firmware components for managing different aspects of the operation of the system. For example, components in a storage controller subsystem may include an operating system, device drivers, device adapters, host adapters, cache, non-volatile memory, etc.

When the system encounters a significant problem or in response to a request, a state data of the system may be determined and stored for analyzing the system. The state data of the system may be referred to as a "statesave." The operations that determine the state of the system and stores the statesave may be referred to as statesave operations. In certain situations, the components of the storage systems are called sequentially or in parallel to save and offload their state data via a statesave process.

One or more storage controllers may be coupled to one or more of a plurality of hosts. The storage controllers may manage a plurality of storage devices, such as disk drives, tape drives, etc., that are coupled to the storage controllers. The plurality of hosts may access data stored in the storage devices via the storage controller. In certain situations, each storage controller may include one or more processing complexes referred to as nodes. For example, a storage controller may include two nodes, where each node may substitute the other in response to a failure of the other node. Each node may be a server.

SUMMARY OF THE PREFERRED EMBODIMENTS

Provided are a method, a system, and a computer program in which a determination is made of a plurality of components whose states are to be determined to generate a statesave. At least one central processing unit that determines a state of a first component of the plurality of components faster than other central processing units is assigned to determine the state of the first component to include in the statesave, where more processing operations have to be performed to determine the state of the first component in comparison to any other component of the plurality of component. One or more of the other central processing units are assigned to other components of the plurality of components to determine states of the other components to include in the statesave.

In further embodiments, the plurality of components are included in a storage controller whose state is stored in the statesave. Additionally, the first component is a cache component of the storage controller, wherein the cache component at least manages a cache of the storage controller.

In additional embodiments, to generate the statesave, processing is performed in a plurality of phases including a beginning phase that is performed sequentially, a main phase that is performed in parallel, and an optional ending phase that is performed sequentially or in parallel.

In further embodiments, each phase of the plurality of phases has a set of defined criteria comprising: a starting condition that indicates when to start work for the phase; a central processing unit assignment condition that indicates which central processing units can perform work during the phase; and an exit condition that indicates when the phase is complete.

In yet further embodiments, modifications to each phase includes: indications to not start a phase for a workgroup comprising one or more components until a phase of another workgroup or another phase of the workgroup has already started; indications to execute a portion or an entire work of the phase of the workgroup on a specific set of central processing unit; and indications to increase or decrease a number of central processing units that are assigned.

In further embodiments, if after a beginning phase further processing of the cache component is necessary then additional central processing units up to a predetermined fraction of a plurality of central processing units are assigned for the processing of the cache component, wherein the additional central processing units are slower than the at least one central processing unit.

In certain embodiments, relatively faster central processing units are assigned to determine states of a cache component that manages a cache of a storage controller, a non-volatile adapter component that manages a non-volatile adapter of the storage controller, and a device adapter component that manages a device adapter for a storage device coupled to the storage controller; and relatively slower central processing units are assigned to determine states of additional components that are different from the cache component, the non-volatile adapter component, and the device adapter component.

BRIEF DESCRIPTION OF THE DRAWINGS

Referring now to the drawings in which like reference numbers represent corresponding parts throughout.

DETAILED DESCRIPTION

Figure 1:
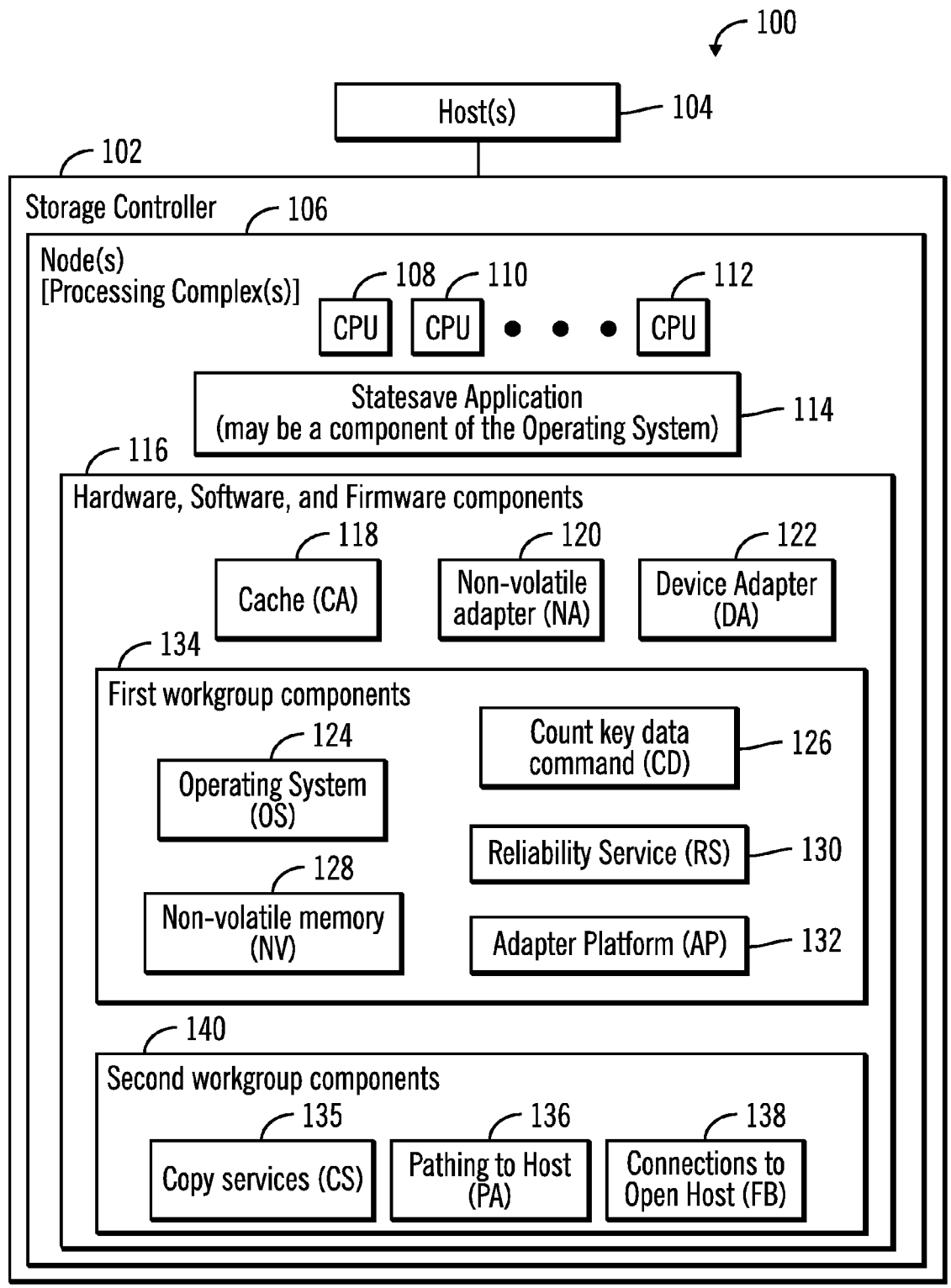
FIG. 1 illustrates a block diagram of a computing environment comprising a storage controller that is coupled to one or more hosts, in accordance with certain embodiments.

In the following description, reference is made to the accompanying drawings which form a part hereof and which illustrate several embodiments. It is understood that other embodiments may be utilized and structural and operational changes may be made.

Statesave Operation on Components of a Storage Controller

In situations where a hardware error, a microcode logic error (MLE), a software error, or some other type of error occurs in the storage controller, the first step in recovery may be to obtain a state of the components to determine the statesave of the storage controller. For example, each microcode component may be responsible for obtaining its specific control blocks, trace buffers, and any other information required to determine the cause of the error condition.

The operating system component (or some other component) may perform the operations for determining the statesave and may initially call each component in order for a "prepare" phase to allow the components to prepare for the next statesave phase. Next, the operating system component may run on all central processing units (CPU) and repeatedly call each component in an ordered sequence for the parallel statesave phase. The component may return "done" (to indicate that the state of the component is determined) or "continue" (to indicate that the state of the component has not been determined) back to the operating system component. If done is returned, then the operating system component no longer calls the specific component that is done. If continue is returned, then the component either could not complete the statesave work within the limits provided by the thread, or has chosen to perform the work in parallel steps and needs to be called again on the same or a different CPU. The operating system component may then call the specific component on multiple CPUs until it returns done.

Certain mechanisms for calling components during the parallel statesave phase may need a global lock for shared structures and a global indicator for the next component to call. In certain mechanism, for determining the statesave, the following operations are performed on each CPU until all the components are processed:
(1) Obtain the global lock;
(2) Obtain the next component that is not done to call;
(3) Update the next component to call to the subsequent component; and
(4) Release the global lock.

The above mechanism may be sufficient when all CPUs have the same performance while accessing the memory. However, on hardware platforms when certain CPUs can access memory faster than others, certain embodiments provide mechanisms that reduce the overall duration for performing the statesave operations.

Certain embodiments may assign specific components of a storage controller into groups, and certain embodiments may also assign specific components or groups to only run on specific CPUs at least in certain phases. In certain embodiments, a CPU that is relatively faster in comparison to other CPUs for determining the state of a cache component is assigned to determine the state of the cache component. Similar preferential assignment of relatively faster CPUs may be provided for determining the state of the non-volatile storage adapter component and the device adapter component, where in certain embodiments the fastest CPU is assigned to the cache component, the second fastest to the non-volatile storage adapter component and the third fastest to the device adapter component. Slower CPUs are assigned for determining the state of other components or groups of components. After a beginning phase, additional CPUs may be assigned to certain components including the cache component, the non-volatile storage adapter component, the device adapter component, etc.

Therefore, certain embodiments provide mechanisms to perform parallel statesave operations by optimizing the allocation of CPUs to perform statesave in a node of a storage controller.

Exemplary Embodiments

FIG. 1 illustrates a block diagram of a computing environment 100 comprising a storage controller 102 that is coupled to one or more hosts 104, in accordance with certain embodiments. The storage controller 102 controls a plurality of storage devices and responds to input/output (I/O) requests from the host 104. In certain embodiments, the storage controller 102 may include one or more nodes 106, where each node may be a processing complex that is a computational device. In certain embodiments if one node of the one or more nodes fail then other nodes can take over the operations of the failed node and as a result the storage controller 102 remains operational for the hosts 104.

The storage controller 102, the hosts 104 and the nodes 106 may comprise any suitable computational device known in the art, such as, such as, a personal computer, a workstation, a server, a mainframe, a hand held computer, a palm top computer, a telephony device, a network appliance, a blade computer, a processing device, etc. The storage controller 102, the hosts 104 and the nodes 106 may be elements in any suitable network, such as, a storage area network, a wide area network, the Internet, an intranet. In certain embodiments, the storage controller 102, the hosts 104 and the nodes 106 may be elements in a cloud computing environment.

The node 106 may include a plurality of CPUs, where three exemplary CPUs 108, 110, 112 are shown. Thus the node 106 is a multiprocessor system. The CPUs 108, 110, 112 may have different processing speed and some may be more proximate to certain memory, hardware devices, or other hardware components than others. As a result, certain CPUs may be able to perform operations faster on certain components of the storage controller.

The node 106 includes a statesave application 114 that may be a component of the operating system that runs on the node 106. The node 106 may also include a plurality of hardware, software, and firmware components 116. It should be noted that the components 116 that are shown in FIG. 1 may be different in different embodiments.

In the storage controller 102 the cache component (CA) 118 may have the most number of operations (i.e., work) to perform for a statesave. The CA component 118 also initially has to perform certain statesave work that is referred to as "singular work" on a single CPU. Once the singular work is completed, then a plurality of CPUs 108, 110, 112 may perform CA work simultaneously. Calling CA on multiple CPUs prior to completing the singular work is just wasting time, since it cannot do any useful work and can only return continue. Once the singular work is complete, the overall statesave duration is the shortest when as many CPUs as possible perform CA work on the fastest memory access CPUs.

The non-volatile storage adapter (NA) component 120 has the second most work to perform after the CA component 118. The NA component 120 also initially has to perform certain statesave work on a single CPU. Once the singular work is completed, then a plurality of CPUs can perform NA work simultaneously. Calling NA on multiple CPUs prior to completing the singular work is just wasting time, since it cannot do any useful work and can only return continue.

The device adapter (DA) component 122 is designed to perform all the statesave work on the first call, but is a high memory access task, and therefore benefits from running on the faster memory access CPUs.

Multiple components [e.g., operating system (OS) component 124, count key data command (CD) component 126, non-volatile memory (NV) component 128, reliability service (RS) component 130, adapter platform (AP) component 132] are shown in first workgroup components 134. The first workgroup 134 may be designed to perform all the statesave work of the components of the first workgroup 134 on the first call (i.e., it never returns continue), and are relatively quick in duration. The memory access speed for such components is not critical, and thus components of the first workgroup 134 may be assigned to run on the slower memory access CPUs.

Other components [e.g., copy services (CS) component 135, pathing to host (PA) component 136, connections to open host (FB) component 138, etc.] that are shown in a second workgroup components 140 may run on a single CPU, or if the above CA and NA singular work is still progressing, these components can run on a set of multiple CPUs (4 for example) simultaneously.

In certain embodiments, once a CPU chooses a component to run, it may continue to call that specific component until it returns done. This reduces overall statesave duration by not bouncing amongst CPUs and burdening processor caches with information from various components. Once the non-CA and non-NA components complete their work, those CPUs can then perform the work to complete the CA and NA statesave tasks.

Certain embodiments may assign specific components of a storage controller into groups, and certain embodiments may also assign specific components to only run on specific CPUs.

Figure 2:
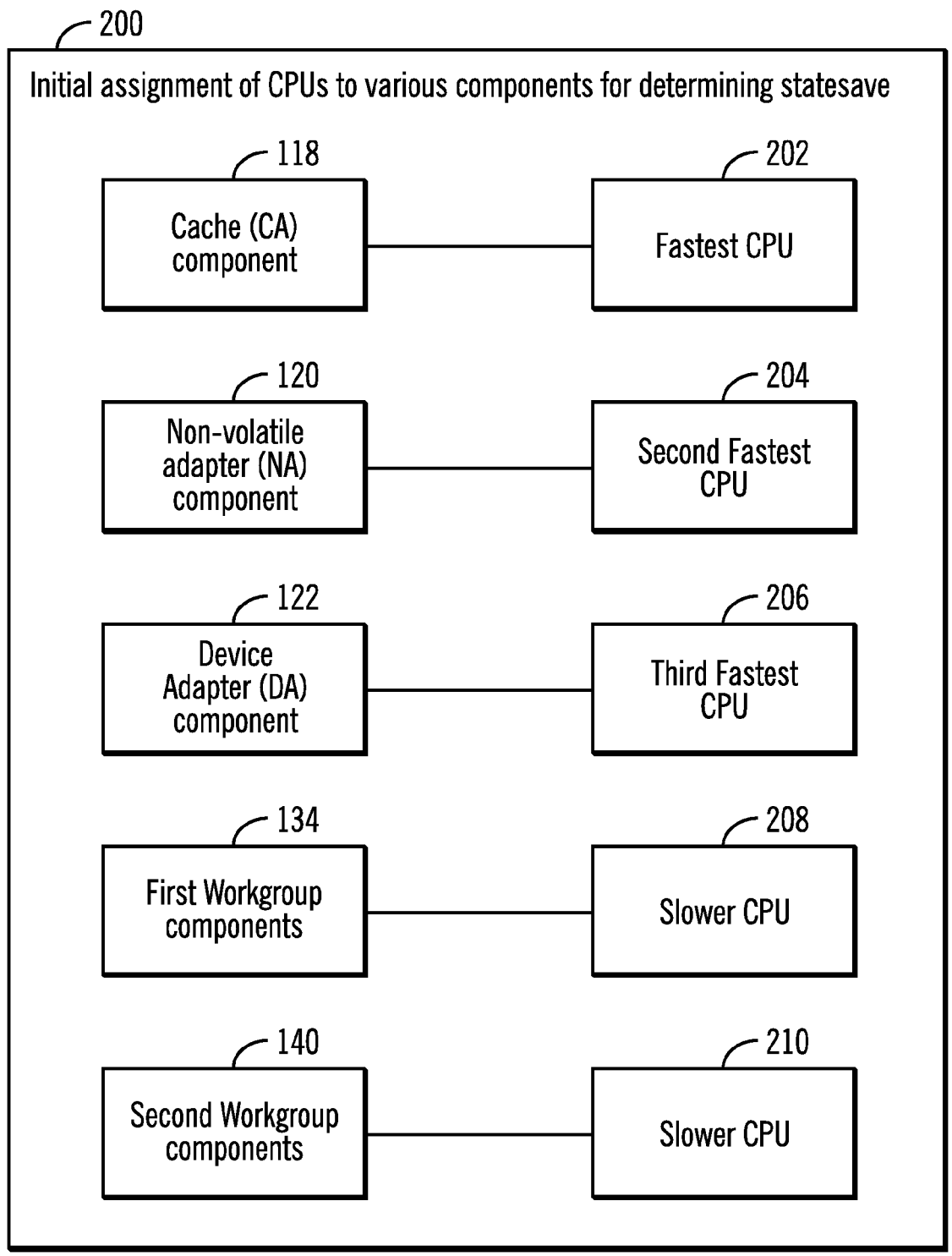
FIG. 2 illustrates a block diagram that shows an initial assignment of central processing units to various components of the storage controller for determining a statesave of the storage controller, in accordance with certain embodiments.

FIG. 2 illustrates a block diagram 200 that shows an initial assignment of CPUs to various components of the storage controller 102 for determining a statesave of the storage controller 102, in accordance with certain embodiments. In certain embodiments, the cache (CA) component 118 is assigned the fastest CPU 202, the non-volatile adapter (NA) component 120 the second fastest CPU 204, the device adapter (DA) component 122 the third fastest CPU 206, and the first workgroup components 134 and the second workgroup components 140 are assigned the slower CPUs 208, 210. At a later point in time the cache component or other components may be assigned other additional CPUs based on certain conditions.

Figure 3:
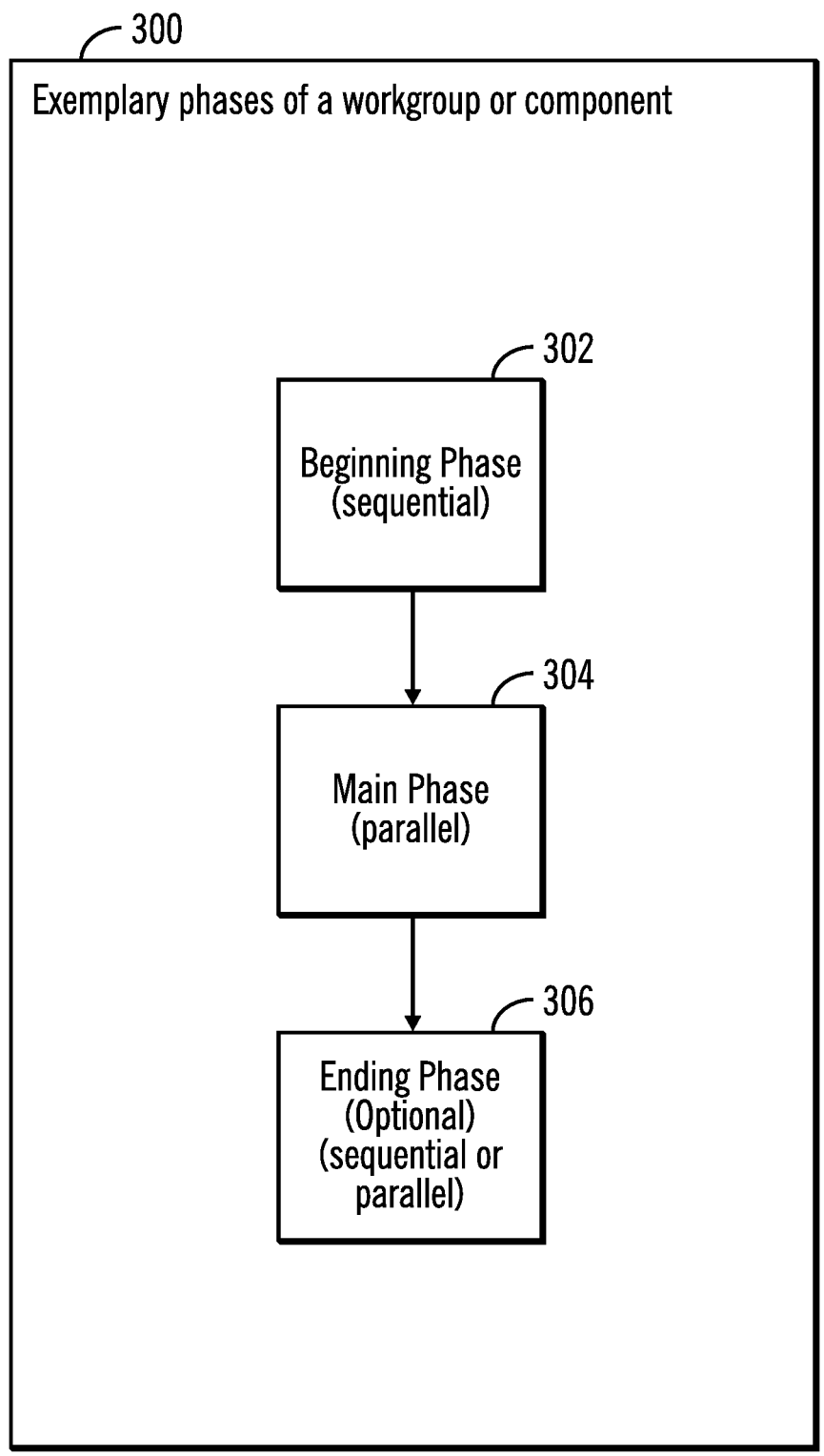
FIG. 3 illustrates a block diagram that shows exemplary phases of a workgroup or a component for determining statesave, in accordance with certain embodiments.

FIG. 3 illustrates a block diagram 300 that shows exemplary phases of a workgroup or a component for determining statesave, in accordance with certain embodiments. In each case, there may be a beginning phase 302 that may be performed sequentially by a single CPU, a main phase 304 that may be performed in parallel by a plurality of CPUs, and an ending phase 306 that is optional and that may be performed sequentially by a single CPU or in parallel by a plurality of CPUs.

Figure 4:
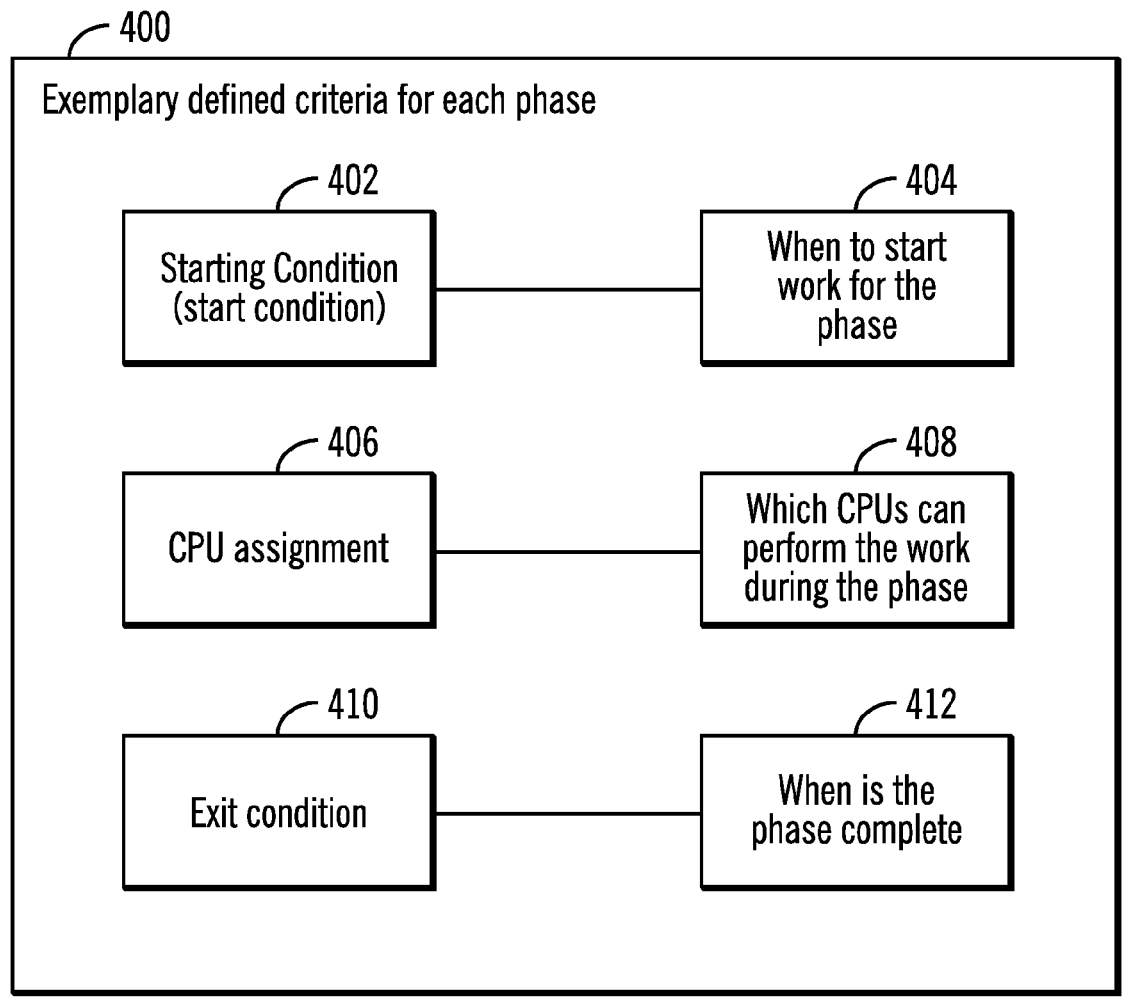
FIG. 4 illustrates a block diagram that shows exemplary defined criteria for each phase, in accordance with certain embodiments.

FIG. 4 illustrates a block diagram 400 that shows exemplary defined criteria for each phase, in accordance with certain embodiments. A starting condition 402 (also referred to as start condition) may indicate when to start work for the phase (shown by reference numeral 404). A CPU assignment 406 may indicate which CPUs can perform the work during the phase (shown by reference numeral 408). An exit condition 410 may indicate when the phase is complete (shown by reference numeral 412)

Figure 5:
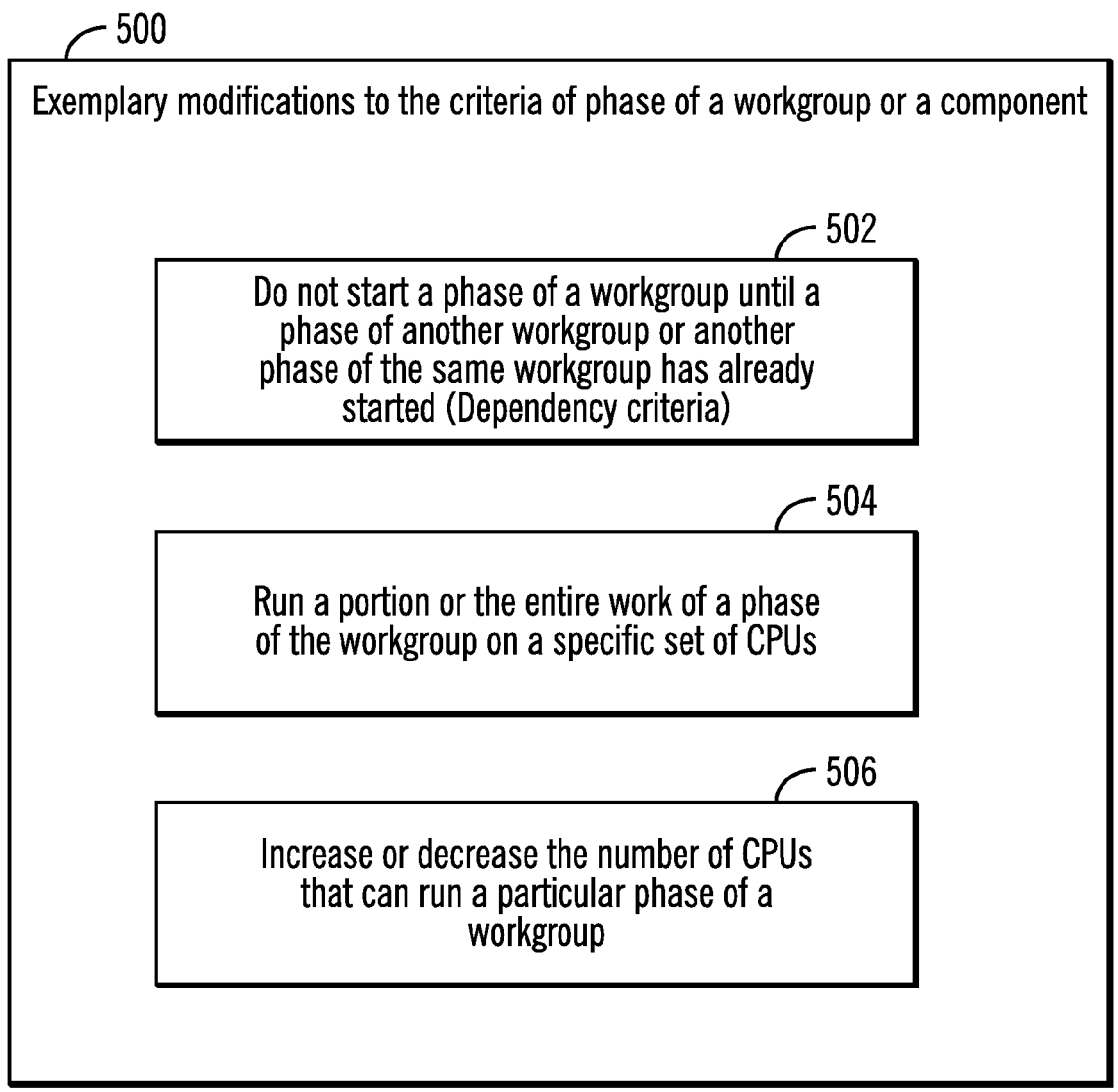
FIG. 5 illustrates a block diagram that shows exemplary modifications to the criteria of a phase of a workgroup or a component, in accordance with certain embodiments.

FIG. 5 illustrates a block diagram 500 that shows exemplary modifications to the criteria of a phase of a workgroup or a component, in accordance with certain embodiments. The modifications to each phase may include indications to not start a phase for a workgroup comprising one or more components until a phase of another workgroup or another phase of the workgroup has already started (as shown by reference numeral 502). Other modifications may include indications to execute a portion or an entire work of the phase of the workgroup on a specific set of central processing units (as shown via reference numeral 504). Still further modifications may include indications to increase or decrease a number of central processing units that are assigned (as shown by reference numeral 506).

Figure 6:
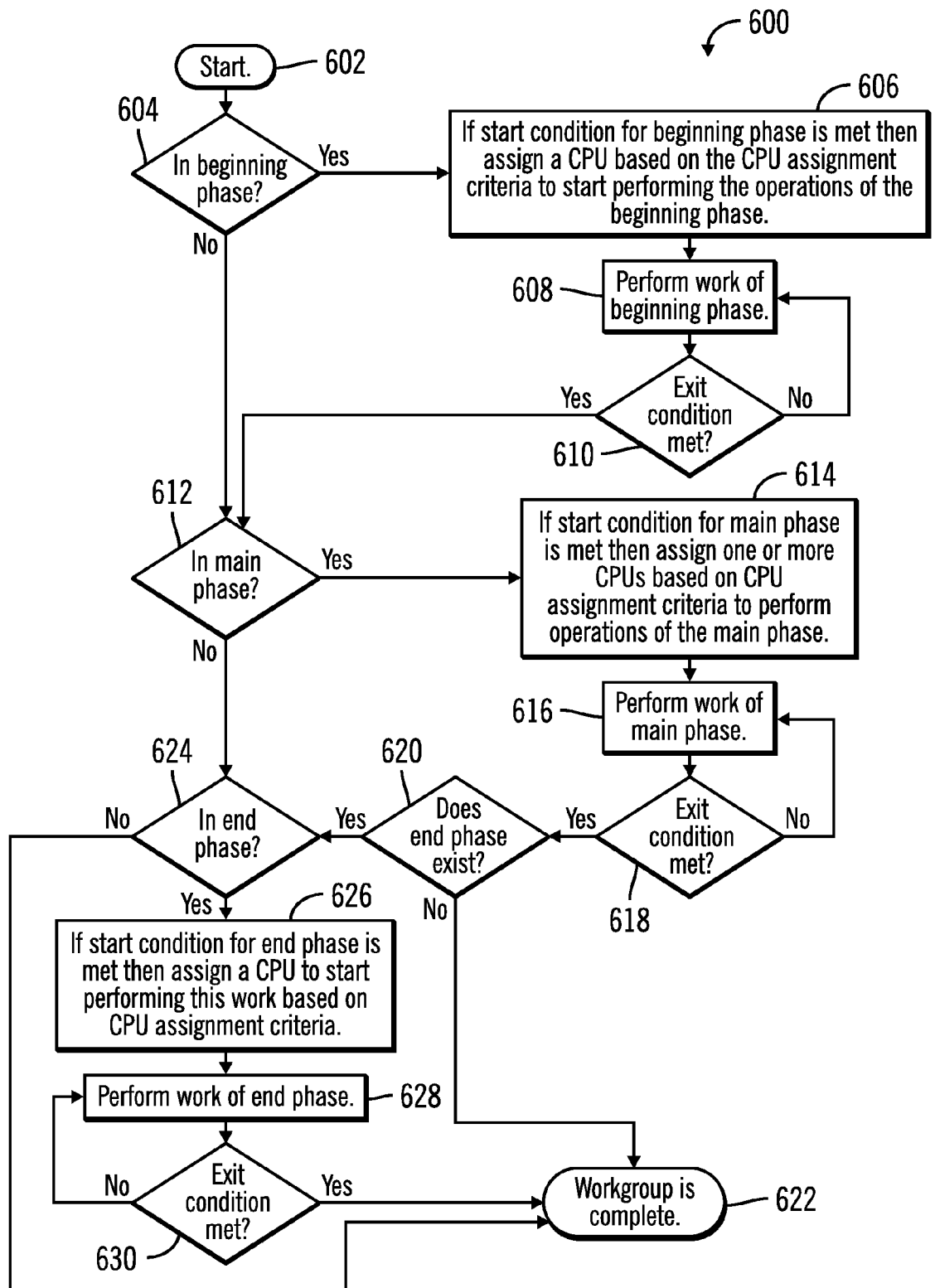
FIG. 6 illustrates a first flowchart that shows operations performed in the storage controller, in accordance with certain embodiments.

FIG. 6 illustrates a first flowchart 600 that shows operations performed in one of the nodes 106 of the storage controller 102, in accordance with certain embodiments. The operations may be performed by the statesave application 114 that may be a component of the operating system of the node 106.

Control starts at block 602 and proceeds to block 604 where the statesave application 114 determines if a workgroup or component is in the beginning phase. If so, control proceeds to block 606 in which if the start condition for the beginning phase is met then a CPU is assigned based on the CPU assignment criteria to start performing operations of the beginning phase. Control proceeds to block 608 in which the operations of the beginning phase are performed. Control proceeds to block 610 in which if an exit condition of the beginning phase is met then control proceeds to the main phase 612. Control proceeds to block 608 if the exit condition of the beginning phase is not met at block 610.

Control reaches block 612 from either block 604 if the workgroup or components are not in the beginning phase or block 610 if the exit condition of the beginning phase is met. If the process is in the main phase at block 612 then control proceeds to block 614 in which if the start condition for the main phase is met then one or more CPUs are assigned based on the CPU assignment criteria to start performing operations of the main phase. From block 614 control proceeds to block 616 in which the operations of the main phase are performed and then control proceeds to block 618 to determine whether the exit condition of the main phase has been met. If not, control returns to block 616.

If the exit condition of the main phase is met at block 618, then control proceeds to block 620 in which the statesave application 114 determines whether there is an end phase of the workgroup or component. If not, then the state generating operations of the workgroup or component is complete (at block 622). If at block 620, the statesave application 114 determines that there is an end phase of the workgroup or component, control proceeds to block 624 to the end phase. If at block 624 a determination is made that the process is in the end phase then if the start condition for the end phase is met then a CPU is assigned as per a CPU assignment criteria to begin performing the work of the end phase (at block 626). Control proceeds to block 628 where operations of the end phase are performed and then a determination is made at block 630 as to whether the exit condition of the end phase is met. If so, control proceeds to block 622 where the operations to determine state of the workgroup or components is complete. If not, control returns to block 628.

If at block 624 a determination is made that the process is not in the end phase then control proceeds to block 622 in where the operations to determine state of the workgroup or components is complete.

Therefore FIG. 6 illustrates certain embodiments in which operations of the beginning, main and end phases are performed for workgroups and/or components based at least on CPU assignment criteria, starting and exit conditions for the phase.

Figure 7:
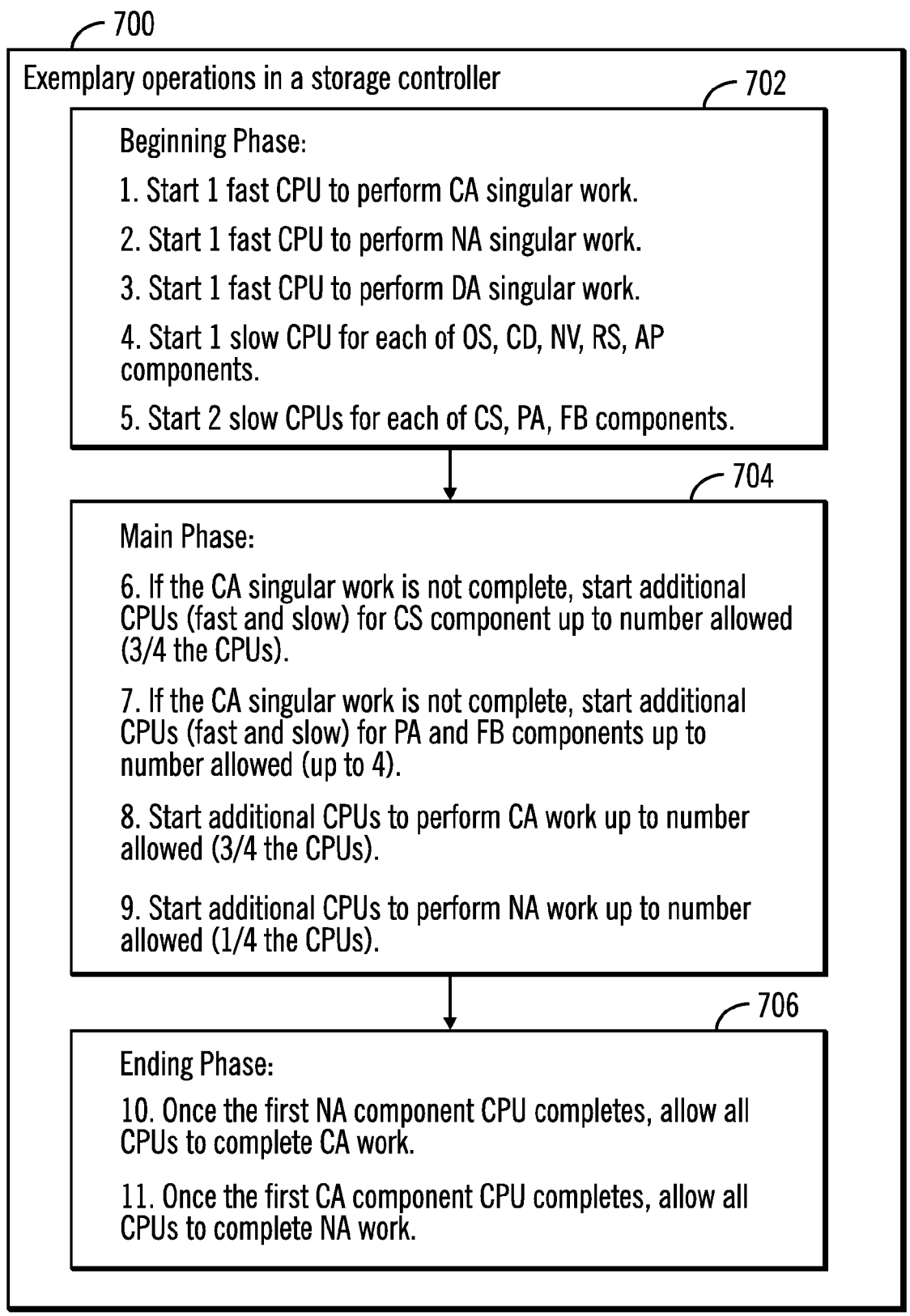
FIG. 7 illustrates a second flowchart that shows operations performed in the storage controller, in accordance with certain embodiments.

FIG. 7 illustrates a second flowchart 700 that shows operations performed in one of the nodes 106 of the storage controller 102, in accordance with certain embodiments. The operations may be performed by the statesave application 114 that may be a component of the operating system of the node 106. The operations may be performed by the statesave application that may be a component of the operating system of the node 106. The components such as CA, NA, DA, OS, CD, NV, RS, AP, CS, PA, FB that are used in the operations of FIG. 7 were described earlier in FIG. 1.

In a beginning phase the following operations (labeled 1-5) are performed by the node 106 (as shown via reference numeral 702):
1. Start 1 fast CPU to perform CA singular work.
2. Start 1 fast CPU to perform NA singular work.
3. Start 1 fast CPU to perform DA singular work.
4. Start 1 slow CPU for each of OS, CD, NV, RS, AP components.
5. Start 2 slow CPUs for each of CS, PA, FB components.

Therefore in the beginning phase 702 CPU assignments are performed.

In the main phase 704 the following operations labeled 6-9 are performed:
6. If the CA singular work is not complete, start additional CPUs (fast and slow) for CS component up to number allowed (3/4 the CPUs).
7. If the CA singular work is not complete, start additional CPUs (fast and slow) for PA and FB components up to number allowed (up to 4).
8. Start additional CPUs to perform CA work up to number allowed (3/4 the CPUs).
9. Start additional CPUs to perform NA work up to number allowed (1/4 the CPUs).

Therefore, in the main phase 704 various starting conditions and CPU assignments are shown.

In the ending phase 706 the following operations labeled 10-11 are performed:
10. Once the first NA component CPU completes, allow all CPUs to complete CA work.
11. Once the first CA component CPU completes, allow all CPUs to complete NA work.

Therefore, in the ending phase 706 various starting conditions are shown, and FIG. 7 at least shows how in in various phases CPUs are allocated based on CPU assignment conditions for various workgroup components and components.

Figure 8:
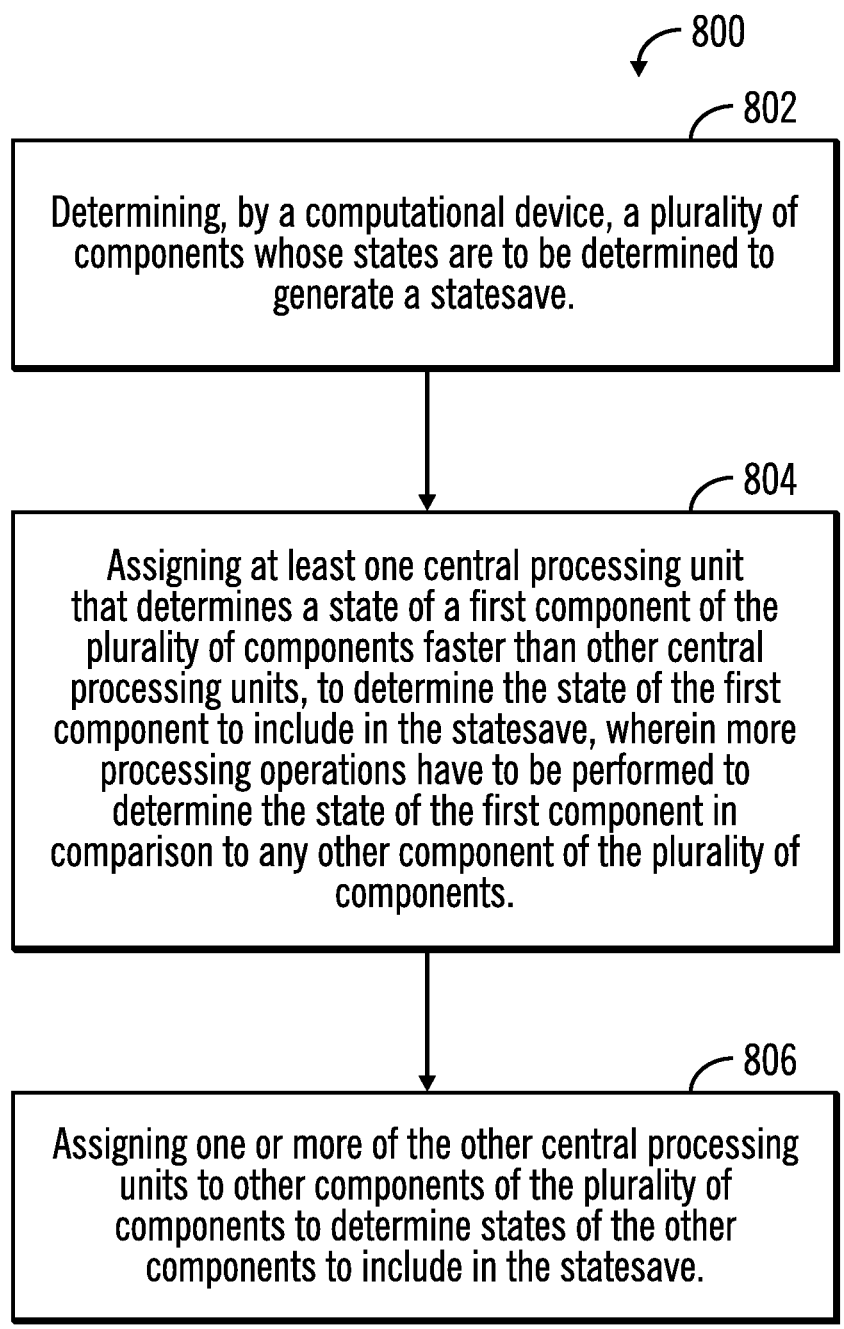
FIG. 8 illustrates a third flowchart that shows operations performed in the storage controller, in accordance with certain embodiments.

FIG. 8 illustrates a third flowchart 800 that shows operations performed in one of the nodes 106 of the storage controller 102, in accordance with certain embodiments. The operations may be performed by the statesave application 114 that may be a component of the operating system of the node 106.

Control starts at block 802 in which a determination is made of a plurality of components 118, 120, 122, 124, 126, 128, 130, 132, 135, 136, 138 whose states are to be determined to generate a statesave. At least one central processing unit 202 that determines a state of a first component 118 of the plurality of components faster than other central processing units is assigned (at block 804) to determine the state of the first component 118 to include in the statesave, where more processing operations have to be performed to determine the state of the first component in comparison to any other component of the plurality of component. One or more of the other central processing units are assigned (at block 806) to other components 120, 122, 124, 126, 128, 130, 132, 135, 136, 138 of the plurality of components to determine states of the other components to include in the statesave.

Therefore, FIGS. 1-8 illustrate certain embodiments to perform parallel statesave operations by optimizing the allocation of CPUs to perform statesave in a node 106 of a storage controller 102 or in any other computational device.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
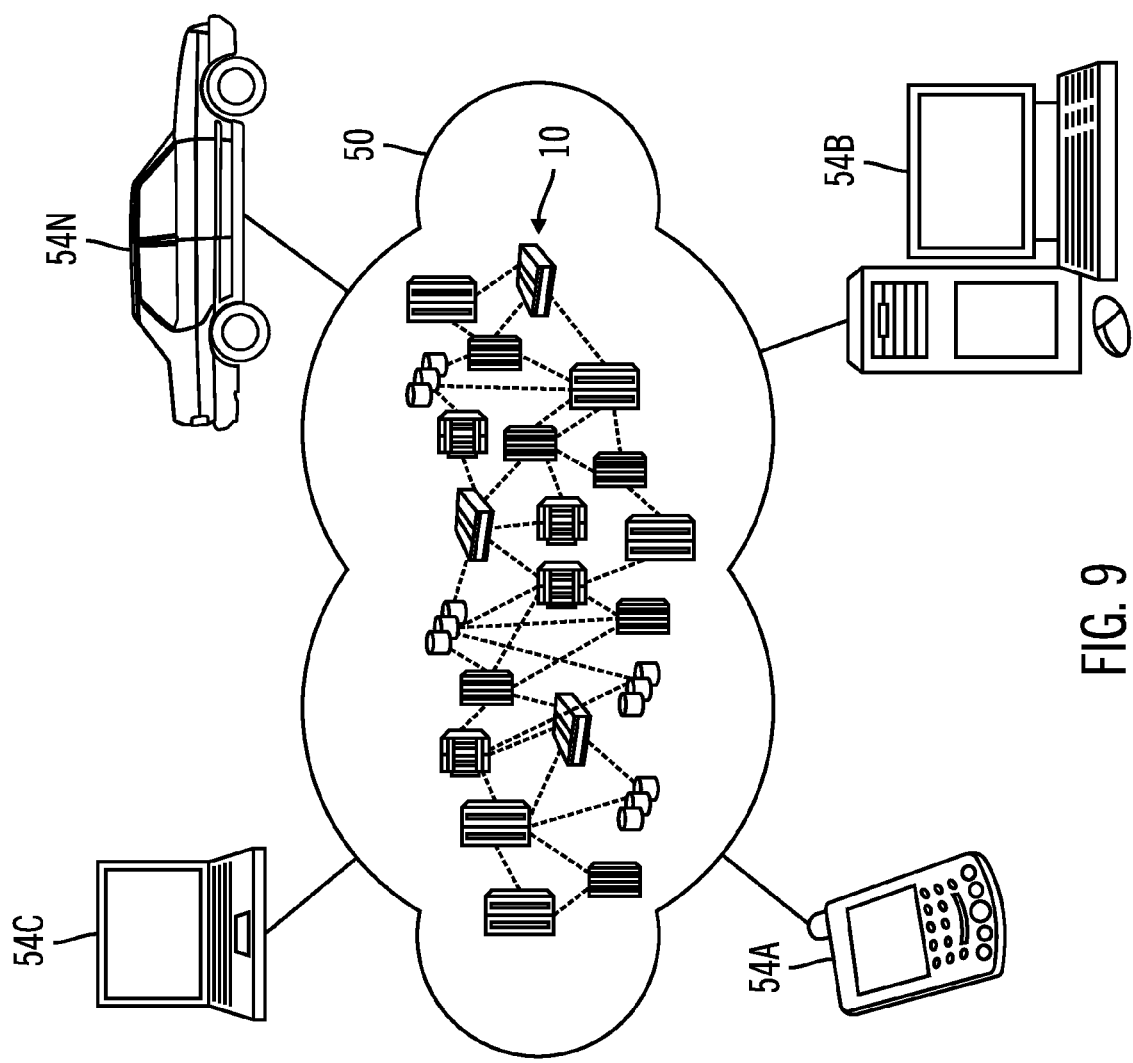
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
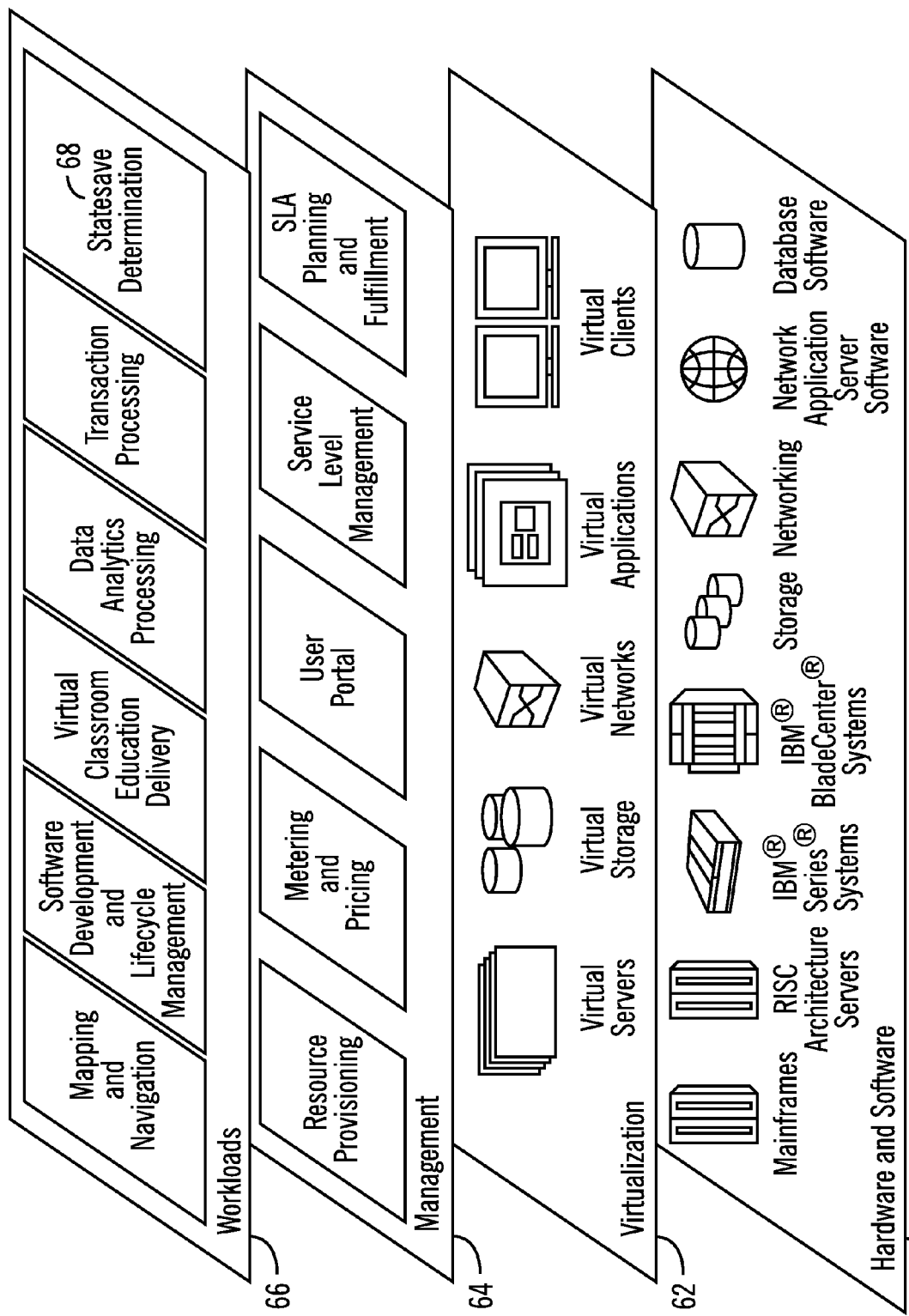
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and statesave determination 68 (as shown in FIGS. 1-10).

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
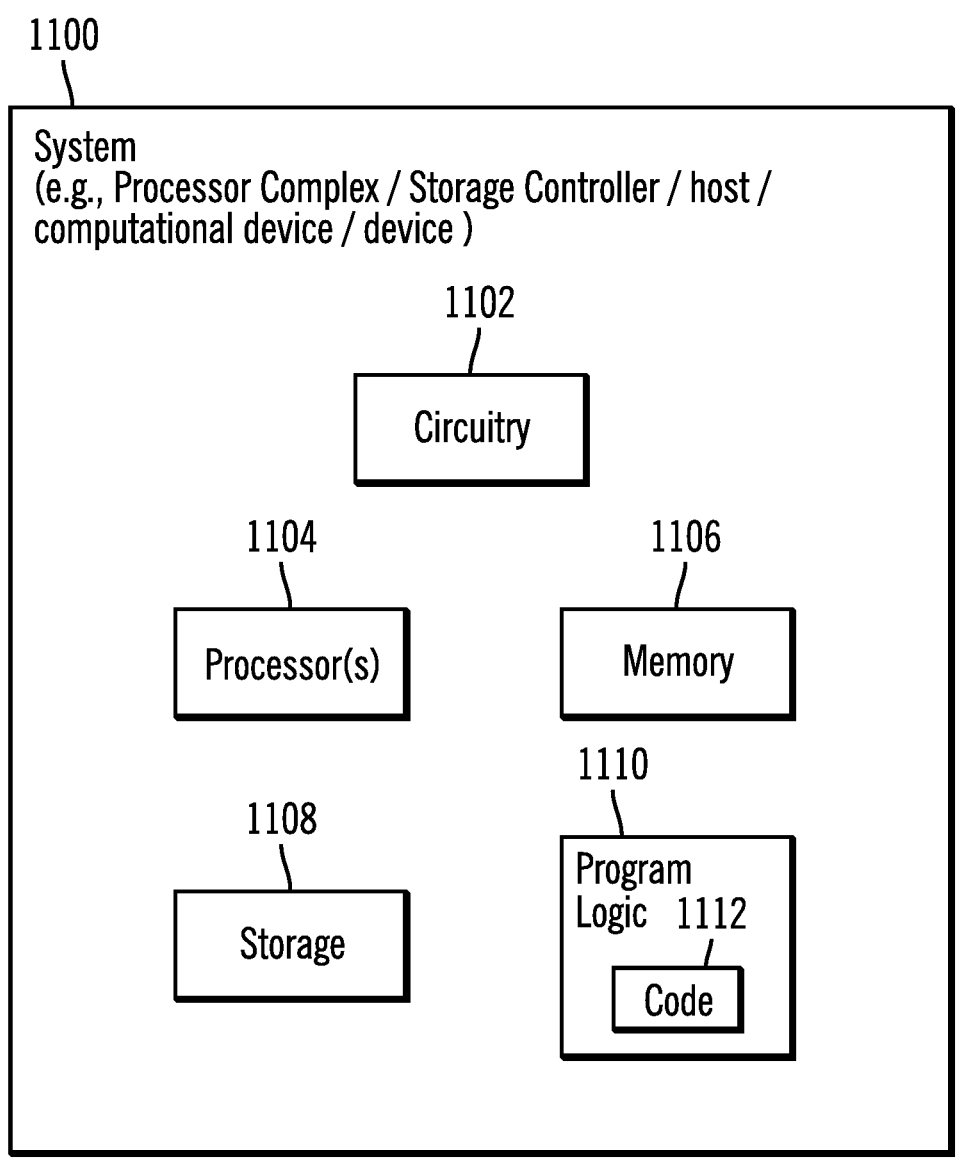
FIG. 11 illustrates a block diagram of a computational system that shows certain elements that may be included in the node, the storage controller or the host shown in FIG. 1, in accordance with certain embodiments.

FIG. 11 illustrates a block diagram that shows certain elements that may be included in the hosts 104 or the storage controller 102 or the nodes 106, or in other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 (e.g., an arithmetic logic unit, a single-core processor, a multi-core processor, a hardware processor, a uniprocessor, a multi-processor, etc.) or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   determining, by a computational device, a plurality of components whose states are to be determined to generate a statesave;
   assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
   assigning one or more of the other central processing units to other components of the plurality of components to determine states of the other components to include in the statesave, wherein the plurality of components are included in a storage controller whose state is stored in the statesave, wherein the first component is a cache component of the storage controller, wherein the cache component at least manages a cache of the storage controller, and wherein to generate the statesave processing is performed in a plurality of phases including a beginning phase that is performed sequentially, a main phase that is performed in parallel, and an optional ending phase that is performed sequentially or in parallel.

2. The method of claim 1, wherein each phase of the plurality of phases has a set of defined criteria comprising:
   a starting condition that indicates when to start work for the phase;
   a central processing unit assignment condition that indicates which central processing units can perform work during the phase; and
   an exit condition that indicates when the phase is complete.

3. The method of claim 2, wherein modifications to each phase includes:
   indications to not start a phase for a workgroup comprising one or more components until a phase of another workgroup or another phase of the workgroup has already started;
   indications to execute a portion or an entire work of the phase of the workgroup on a specific set of central processing unit; and
   indications to increase or decrease a number of central processing units that are assigned.

4. A method, comprising:
   determining, by a computational device, a plurality of components whose states are to be determined to generate a statesave;
   assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
   assigning one or more of the other central processing units to other components of the plurality of components to determine states of the other components to include in the statesave, wherein the plurality of components are included in a storage controller whose state is stored in the statesave, wherein the first component is a cache component of the storage controller, wherein the cache component at least manages a cache of the storage controller, and wherein if after a beginning phase further processing of the cache component is necessary then additional central processing units up to a predetermined fraction of the plurality of central processing units are assigned for the processing of the cache component, and wherein the additional central processing units are slower than the at least one central processing unit.

5. A method, comprising:
   determining, by a computational device, a plurality of components whose states are to be determined to generate a statesave;
   assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
   assigning one or more of the other central processing units to other components of the plurality of components to determine states of the other components to include in the statesave, wherein:
   each of a first set of central processing units are faster in terms of processing capabilities than each of a second set of central processing units;
   the first set of central processing units are assigned to determine states of a cache component that manages a cache of a storage controller, a non-volatile adapter component that manages a non-volatile adapter of the storage controller, and a device adapter component that manages a device adapter for a storage device coupled to the storage controller; and
   the second set of central processing units are assigned to determine states of additional components that are different from the cache component, the non-volatile adapter component, and the device adapter component.

6. A system, comprising:
   a memory; and
   a processor coupled to the memory, wherein a processor performs operations, the operations comprising:
   determining a plurality of components whose states are to be determined to generate a statesave;

assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and assigning one or more of the other central processing units to other components of the plurality of components to determine states of the other components to include in the statesave, wherein the plurality of components are included in a storage controller whose state is stored in the statesave, wherein the first component is a cache component of the storage controller, wherein the cache component at least manages a cache of the storage controller, and wherein to generate the statesave processing is performed in a plurality of phases including a beginning phase that is performed sequentially, a main phase that is performed in parallel, and an optional ending phase that is performed sequentially or in parallel.

7. The system of claim 6, wherein each phase of the plurality of phases has a set of defined criteria comprising:
a starting condition that indicates when to start work for the phase;
a central processing unit assignment condition that indicates which central processing units can perform work during the phase; and
an exit condition that indicates when the phase is complete.

8. The system of claim 7, wherein modifications to each phase includes:
indications to not start a phase for a workgroup comprising one or more components until a phase of another workgroup or another phase of the workgroup has already started;
indications to execute a portion or an entire work of the phase of the workgroup on a specific set of central processing unit; and
indications to increase or decrease a number of central processing units that are assigned.

9. A system, comprising:
a memory; and
a processor coupled to the memory, wherein a processor performs operations, the operations comprising:
determining a plurality of components whose states are to be determined to generate a statesave;
assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
assigning one or more of the other central processing units to other components of the plurality of components to determine states of the other components to include in the statesave, wherein the plurality of components are included in a storage controller whose state is stored in the statesave, wherein the first component is a cache component of the storage controller, wherein the cache component at least manages a cache of the storage controller, and
wherein if after a beginning phase further processing of the cache component is necessary then additional central processing units up to a predetermined fraction of the plurality of central processing units are assigned for the processing of the cache component, and wherein the additional central processing units are slower than the at least one central processing unit.

10. A system, comprising:
a memory; and
a processor coupled to the memory, wherein a processor performs operations, the operations comprising:
determining a plurality of components whose states are to be determined to generate a statesave;
assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
assigning one or more of the other central processing units to other components of the plurality of components to determine states of the other components to include in the statesave, wherein:
each of a first set of central processing units are faster in terms of processing capabilities than each of a second set of central processing units;
the first set of central processing units are assigned to determine states of a cache component that manages a cache of a storage controller, a non-volatile adapter component that manages a non-volatile adapter of the storage controller, and a device adapter component that manages a device adapter for a storage device coupled to the storage controller; and
the second set of central processing units are assigned to determine states of additional components that are different from the cache component, the non-volatile adapter component, and the device adapter component.

11. A computer program product, the computer program product comprising a computer readable storage medium having computer readable program code embodied therewith, the computer readable program code configured to perform operations on a computational device, the operations comprising:
determining a plurality of components whose states are to be determined to generate a statesave;
assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
assigning one or more of the other central processing units to other components of the plurality of components to determine states of the other components to include in the statesave, wherein the plurality of components are included in a storage controller whose state is stored in the statesave, wherein the first component is a cache component of the storage controller, wherein the cache component at least manages a cache of the storage controller, and wherein to generate the statesave processing is performed in a plurality of phases including a beginning phase that is performed sequentially, a main phase that is performed in parallel, and an optional ending phase that is performed sequentially or in parallel.

12. The computer program product of claim 11, wherein each phase of the plurality of phases has a set of defined criteria comprising:
   a starting condition that indicates when to start work for the phase;
   a central processing unit assignment condition that indicates which central processing units can perform work during the phase; and
   an exit condition that indicates when the phase is complete.

13. The computer program product of claim 12, wherein modifications to each phase includes:
   indications to not start a phase for a workgroup comprising one or more components until a phase of another workgroup or another phase of the workgroup has already started;
   indications to execute a portion or an entire work of the phase of the workgroup on a specific set of central processing unit; and
   indications to increase or decrease a number of central processing units that are assigned.

14. A computer program product, the computer program product comprising a computer readable storage medium having computer readable program code embodied therewith, the computer readable program code configured to perform operations on a computational device, the operations comprising:
   determining a plurality of components whose states are to be determined to generate a statesave;
   assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
   assigning one or more of the other central processing units to other components of the plurality of components to determine states of the other components to include in the statesave, wherein the plurality of components are included in a storage controller whose state is stored in the statesave, wherein the first component is a cache component of the storage controller, wherein the cache component at least manages a cache of the storage controller, and wherein if after a beginning phase further processing of the cache component is necessary then additional central processing units up to a predetermined fraction of the plurality of central processing units are assigned for the processing of the cache component, and wherein the additional central processing units are slower than the at least one central processing unit.

15. A computer program product, the computer program product comprising a computer readable storage medium having computer readable program code embodied therewith, the computer readable program code configured to perform operations on a computational device, the operations comprising:
   determining a plurality of components whose states are to be determined to generate a statesave;
   assigning at least one central processing unit that determines a state of a first component of the plurality of components faster than other central processing units, to determine the state of the first component to include in the statesave, wherein more processing operations have to be performed to determine the state of the first component in comparison to any other component of the plurality of components, wherein the at least one central processing unit and the other central processing units together comprise a plurality of central processing units; and
   assigning one or more of the other central processing units to other components of the plurality of components to determine states of the other components to include in the statesave, wherein:
   each of a first set of central processing units are faster in terms of processing capabilities than each of a second set of central processing units;
   the first set of central processing units are assigned to determine states of a cache component that manages a cache of a storage controller, a non-volatile adapter component that manages a non-volatile adapter of the storage controller, and a device adapter component that manages a device adapter for a storage device coupled to the storage controller; and
   the second set of central processing units are assigned to determine states of additional components that are different from the cache component, the non-volatile adapter component, and the device adapter component.

* * * * *